US008530369B2

(12) United States Patent
Lewis et al.

(10) Patent No.: US 8,530,369 B2
(45) Date of Patent: *Sep. 10, 2013

(54) CATALYST AND METHOD OF MANUFACTURE

(75) Inventors: Larry Neil Lewis, Scotia, NY (US); Oltea Puica Siclovan, Rexford, NY (US); Hrishikesh Keshavan, Clifton Park, NY (US); Dan Hancu, Clifton Park, NY (US); Benjamin Hale Winkler, Albany, NY (US)

(73) Assignee: General Electric Company, Niskayuna, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 12/123,070

(22) Filed: May 19, 2008

(65) Prior Publication Data

US 2009/0074641 A1    Mar. 19, 2009

Related U.S. Application Data

(60) Provisional application No. 60/994,447, filed on Sep. 19, 2007.

(51) Int. Cl.
  *B01J 23/00*   (2006.01)
  *B01J 21/00*   (2006.01)
  *B01J 20/00*   (2006.01)

(52) U.S. Cl.
  USPC .......... 502/150; 502/104; 502/240; 502/300; 502/439

(58) Field of Classification Search
  USPC ............... 502/104, 150, 240–262, 300–439
  See application file for complete search history.

(56) References Cited

U.S. PATENT DOCUMENTS

| 5,244,852 A | | 9/1993 | Lachman et al. |
| 5,510,306 A | | 4/1996 | Murray |
| 5,622,684 A | * | 4/1997 | Pinnavaia et al. ............. 423/702 |
| 5,710,093 A | * | 1/1998 | Rivas et al. .................... 502/439 |
| 5,750,459 A | * | 5/1998 | Marella et al. ................. 502/304 |
| 5,785,946 A | * | 7/1998 | Pinnavaia et al. ............. 423/701 |
| 5,795,559 A | | 8/1998 | Pinnavaia et al. |

(Continued)

FOREIGN PATENT DOCUMENTS

| EP | 0787522 | 8/1997 |
| EP | 1029582 A1 | 8/2000 |
| EP | 1832345 A1 | 9/2007 |
| WO | 9929400 A1 | 6/1999 |

OTHER PUBLICATIONS

P.A. Jacobs, et al., Introduction to Acid Cataysis with Zeolites in Hydrocarbon Reactions, Stud. Surf. Sci. Catal. (1991) pp. 445-496, vol. 58.

(Continued)

*Primary Examiner* — Cam N. Nguyen
(74) *Attorney, Agent, or Firm* — Joseph J Christian

(57) ABSTRACT

A catalyst composition is provided that includes a catalytic metal secured to a substrate, and the substrate is mesoporous and has pores that are templated. A catalyst composition includes a catalytic metal secured to a mesoporous substrate. The mesoporous substrate is a reaction product of a reactive solution, a solvent, a modifier, and a templating agent. A method includes reacting a reactive solution and a templating agent to form a gel; and calcining the gel to form a substrate having a mesoporous template that is capable to support a catalyst composition.

12 Claims, 9 Drawing Sheets

(56) References Cited

U.S. PATENT DOCUMENTS

| | | | |
|---|---|---|---|
| 5,800,799 A * | 9/1998 | Pinnavaia et al. | 423/702 |
| 5,800,800 A * | 9/1998 | Pinnavaia et al. | 423/702 |
| 5,802,845 A | 9/1998 | Abe et al. | |
| 5,840,264 A * | 11/1998 | Pinnavaia et al. | 423/277 |
| 5,855,864 A * | 1/1999 | Pinnavaia et al. | 423/708 |
| 5,911,966 A * | 6/1999 | Muller et al. | 423/625 |
| 6,045,765 A * | 4/2000 | Nakatsuji et al. | 423/239.1 |
| 6,146,602 A * | 11/2000 | Narula et al. | 423/213.5 |
| 6,163,414 A * | 12/2000 | Kikuchi et al. | 359/776 |
| 6,410,473 B1 * | 6/2002 | Pinnavaia et al. | 502/74 |
| 6,413,902 B1 * | 7/2002 | Pinnavaia et al. | 502/167 |
| 6,465,387 B1 * | 10/2002 | Pinnavaia et al. | 502/158 |
| 6,576,568 B2 * | 6/2003 | Mandal et al. | 438/781 |
| 6,649,083 B1 * | 11/2003 | Pinnavaia et al. | 252/179 |
| 6,696,258 B1 * | 2/2004 | Wei et al. | 435/7.2 |
| 6,703,343 B2 | 3/2004 | Park | |
| 6,896,955 B2 * | 5/2005 | Mandal et al. | 428/312.6 |
| 6,946,109 B2 * | 9/2005 | Pinnavaia et al. | 423/335 |
| 6,962,193 B2 * | 11/2005 | Liu et al. | 165/109.1 |
| 7,153,810 B2 | 12/2006 | Park et al. | |
| 7,166,545 B2 * | 1/2007 | Nishiyama et al. | 438/780 |
| 7,214,643 B2 * | 5/2007 | Yamamoto et al. | 502/300 |
| 7,220,684 B2 * | 5/2007 | Nishiyama et al. | 438/781 |
| 7,645,934 B1 * | 1/2010 | Fidanza et al. | 136/263 |
| 7,709,414 B2 | 5/2010 | Fujdala et al. | |
| 7,803,338 B2 | 9/2010 | Socha et al. | |
| 8,034,311 B2 | 10/2011 | Ikeda et al. | |
| 8,037,674 B2 | 10/2011 | Kupe et al. | |
| 8,137,750 B2 | 3/2012 | Brey | |
| 2003/0176280 A1 | 9/2003 | Caze et al. | |
| 2003/0232250 A1 * | 12/2003 | Nogami et al. | 429/313 |
| 2004/0042947 A1 | 3/2004 | Hoard et al. | |
| 2004/0087184 A1 * | 5/2004 | Mandal et al. | 438/781 |
| 2004/0179996 A1 | 9/2004 | Shan et al. | |
| 2004/0229054 A1 * | 11/2004 | Ahluwalia et al. | 428/457 |
| 2004/0241067 A1 * | 12/2004 | Oki et al. | 423/213.2 |
| 2005/0014635 A1 * | 1/2005 | Zhou et al. | 502/159 |
| 2005/0020442 A1 * | 1/2005 | Sermon et al. | 502/304 |
| 2005/0215149 A1 * | 9/2005 | Ahluwalia | 442/152 |
| 2005/0239643 A1 * | 10/2005 | Benderly et al. | 502/312 |
| 2006/0030477 A1 | 2/2006 | Chaumonnot et al. | |
| 2006/0074218 A1 * | 4/2006 | Moon et al. | 528/297 |
| 2006/0110308 A1 * | 5/2006 | Gupta et al. | 423/345 |
| 2006/0137817 A1 * | 6/2006 | Ma et al. | 156/296 |
| 2006/0216227 A1 * | 9/2006 | Idem et al. | 423/651 |
| 2006/0228283 A1 | 10/2006 | Malaya et al. | |
| 2007/0149385 A1 | 6/2007 | Liu et al. | |
| 2007/0160899 A1 * | 7/2007 | Atanassova et al. | 429/44 |
| 2008/0020925 A1 * | 1/2008 | Larcher et al. | 502/303 |
| 2008/0124264 A1 | 5/2008 | Ikeda et al. | |
| 2008/0131345 A1 | 6/2008 | Vitse et al. | |
| 2009/0074641 A1 * | 3/2009 | Lewis et al. | 423/213.2 |
| 2009/0093360 A1 * | 4/2009 | Ma et al. | 502/182 |
| 2010/0196236 A1 * | 8/2010 | Lewis et al. | 423/239.1 |
| 2010/0196237 A1 * | 8/2010 | Yin et al. | 423/239.1 |
| 2010/0233053 A1 * | 9/2010 | Lewis et al. | 423/239.1 |
| 2010/0273091 A1 | 10/2010 | Brey | |
| 2011/0047988 A1 | 3/2011 | Lewis et al. | |
| 2011/0047995 A1 | 3/2011 | Lewis et al. | |
| 2011/0209466 A1 | 9/2011 | Yin | |

OTHER PUBLICATIONS

M. Richter, et al., Combinatorial Preparation and High-Throughput Catalytic Tests of Multi-Component deNOx Catalysts; Applied Catalysis (2002) pp. 261-277, vol. 36, Elsevier Science B.V.

G.J. de A.A. Soler-Illia, et al., Block Copolymer-Templated Mesoporous Oxides; Current Opinion in Colloid and Interface Science (2003), pp. 109-126, vol. 8, Elsevier Science, Ltd.

W. Deng, et al., Surfactant-Assisted Synthesis of Alumina with Hierarchical Nanopores; Advanced Functional Materials (2003), pp. 61-65, vol. 13, No. 1, Wiley-VCH Verlag GmbH & Co. KGaA, Weinheim.

L.-E. Lindfors, et al., Silver/Alumina Catalyst for Selective Catalytic Reduction of NOx to N2 by Hydrocarbons in Diesel Powered Vehicles (2004) pp. 185-189, vol. 28, No. 1-4, Plenum Publishing Corporation.

S. Panayotova, et al., Borders of the Liquid Crystalline Phase in the Triton X-114—Water Binary System; Bulgarian Journal of Physics (2004) pp. 83-86, vol. 31, Heron Press Ltd.

H. He, et al., Selective Catalytic Reduction of NOx over Ag/AlxO3 Catalyst: From Reaction Mechanism to Diesel Engine Test; Catalysis Today (2005) pp. 37-47, vol. 100, Elsevier, Inc.

V. Gonzalez-Pena, et al., Sol-gel Synthesis of Mesostructured Aluminas from Chemically Modified Aluminum Sec-butoxide Using Non-Ionic Surfactant Templating; Microporous and Mesoporous Materials (2005) pp. 173-182, vol. 80, Elsevier, Inc.

V. Houel, et al., A Comparison of the Activity and Deactivation of Ag/Al2O3 and Cu/ZSM-5 for HC-SCR Under Simulated Diesel Exhaust Emission Conditions; Journal of Catalysis (2005) pp. 150-157, vol. 230, Elsevier, Inc.

R. Brosius, et al., Adsorption Chemistry of NOx on Ag/Al2O3 Catalyst for Selective Catalytic Reduction of NOx using Hydrocarbons; Journal of Catalysis (2005) pp. 344-353, vol. 231, Elsevier, Inc.

A. Zecchina, et al., Anatomy of Catalytic Centers in Phillips Ethylene Polymerization Catalyst; Topics in Organometallic Chemistry (2005) pp. 1-35, vol. 16 Springer-Verlag Berlin Heidelberg.

Z. Liu, et al., Recent Advances in Catalytic DeNOx Science and Technology; Catalysis Reviews (2006) pp. 43-89, vol. 48, Taylor & Francis Group, LLC.

X. She, et al., A Role of Ag—O—Al Species in Silver-Alumina Catalysts for the Selective Catalytic Reduction of NOx with Methane; Journal of Catalysis (2006) pp. 79-93, vol. 237, Elsevier, Inc.

J.P. Breen, et al., A Fast Transient Kinetic Study of the Effect of H2 on the Selective Catalytic Reduction of NOx with Octane Using Isotopically Labelled 15NO; Journal of Catalysis (2007) pp. 1-9, vol. 246, Elsevier Inc.

V. Houel, et al., Fuel Effects on the Activity of Silver Hydrocarbon-SCR Catalysts; Appl. Catal. B: Environmental (2007) pp. 203-207, vol. 73, Elsevier B.V.

PCT/US2008/069744 Search Report and Written Opinion, Feb. 2011.

Z. Liu et al., "Recent Advances in Catalytic DeNOx Science and Technology," Taylor & Francis Group, LLC, ISSN: 0161-4940, Catalysis Reviews, vol. 48, 2006, pp. 43-89.

E. Seker et al., "Nitric oxide reduction by propene over silver/alumina and silver-gold/alumina catalysts: effect of preparation methods," Elsevier, Applied Catalysis, A: General, vol. 183, 1999, pp. 121-134.

K. Shimizu et al., "Silver-alumina catalysts for selective reduction of NO By higher hydrocarbons: structure of active sites and reaction mechanism," Elsevier, Applied Catalysis, B: Environmental, vol. 30, 2001, pp. 151-162.

M. Richter et al., "The effect of hydrogen on the selective catalytic reduction of NO in excess oxygen over Ag/Al2O3," Elsevier, Applied Catalysis, B. Environmental, vol. 51, 2004, pp. 261-274.

A. Taguchi et al., "Ordered mesoporous materials in catalysis," Elsevier, Microporous and Mesoporous Materials, vol. 77, 2005, pp. 1-45.

A. Corma, "From Microporous to Mesoporous Molecular Sieve Materials and Their Use in Catalysis," American Chemical Society, 1997, vol. 97, No. 6, pp. 2373-2419.

G. J. de A. Soler-Illia et al., "Chemical Startegies to Design Textured Materials: from Microporous and Mesoporous Oxides to Nanonetworks and Hierarchical Structures," American Chemical Society, 2002, vol. 102, No. 11, pp. 4093-4138.

F. Delprato et al., "Synthesis of new silica-rich cubic and hexagonal faujasites using crown-ether-based supramolecules as templates," Zeolites, Jul./Aug. 1990, vol. 10, pp. 546-552.

C. Liu et al., "A Novel Family of Ordered, Mesoporous Inorganic/Organic Hybrid Polymers Containing Covalently and Multiply Bound Microporous Organic Hosts," Journal American Chemical Society Articles, vol. 125, No. 21, 2003, pp. 6452-6461.

T. Fan et al., "Synthesis of biomorphic Al2O3 based on natural plant templates and assembly of Ag nanoparticles controlled within the nanopores," Elsevier, Microporous and Mesoporous Materials, vol. 108, 2008, pp. 204-212.

* cited by examiner

FIG. 1

| | | |
|---|---|---|
| Poly(alkylene-oxide) block copolymers | HO−(CH$_2$−CH$_2$−O)$_n$−(CH(CH$_3$)−CH$_2$−O)$_m$−(CH$_2$−CH$_2$−O)$_n$−H | Pluronic PEO-PPO-PEO |
| | HO−(CH(CH$_3$)−CH$_2$−O)$_n$−(CH$_2$−CH$_2$−O)$_m$−(CH$_2$−CH(CH$_3$)−O)$_n$−H | Pluronic R PPO-PEO-PPO |
| | HO−(CH$_2$−CH$_2$−O)$_n$−(CH(CH$_2$CH$_3$)−CH$_2$−O)$_m$−(CH$_2$−CH$_2$−O)$_n$−H | PEO-PBO-PEO |
| | HO−(CH(CH$_2$CH$_3$)−CH$_2$−O)$_m$−(CH$_2$−CH$_2$−O)$_n$−H | PBO-PEO |
| | H−(O−CH$_2$−CH$_2$)$_n$−(O−CH(CH$_3$)−CH$_2$)$_m$ \ N−CH$_2$−CH$_2$−N / (CH$_2$−CH(CH$_3$)−O)$_m$−(CH$_2$−CH$_2$−O)$_n$−H  (repeated on both arms) | Tetronic |
| Oligomeric alkyl poly(ethylene oxide) | CH$_3$−(CH$_2$)$_n$−(O−CH$_2$−CH$_2$)$_m$−OH | Brij |
| | CH$_3$−CH(CH$_3$)−CH(CH$_3$)−CH$_2$−CH$_2$−CH(CH$_3$)−(O−CH$_2$−CH$_2$)$_x$−OH | Tergitol |
| Alkyl-phenol poly(ethylene oxide) | CH$_3$−C(CH$_3$)$_2$−CH$_2$−C(CH$_3$)$_2$−C$_6$H$_4$−(O−CH$_2$−CH$_2$)$_x$−OH | Triton |
| Sorbitan esters | HO−(CH$_2$−CH$_2$−O)$_w$−[sorbitan ring]−(O−CH$_2$−CH$_2$)$_x$−OH, CH(O−CH$_2$−CH$_2$)$_y$−OH, CH$_2$−O−(CH$_2$−CH$_2$−O)$_z$−C(=O)−R;  x+y+z+w=20 | Tween |
| | [sorbitan ring with HO, OH]−CH(OH)−CH$_2$−O−C(=O)−(CH$_2$)$_n$−CH$_3$ | Span |

CATALYST AND METHOD OF MANUFACTURE

CROSS-REFERENCE TO RELATED APPLICATIONS

This application claims priority to provisional application 60/994,447 filed on Sep. 19, 2007, the entire contents of which are hereby incorporated by reference.

BACKGROUND

1. Technical Field

This invention includes embodiments that may relate to catalysts. This invention includes embodiments that may relate to methods of making catalysts. This invention includes embodiments that may relate to articles that include catalysts.

2. Discussion of Art

Exhaust gas streams may contain nitrogen oxides (NOx), unburned hydrocarbons (HC), and carbon monoxide (CO). It may be sometimes desirable to control and/or reduce the amount of one or more of the exhaust gas stream constituents. NOx is thermodynamically unstable but does not spontaneously decompose in the absence of a catalyst. Exhaust gas streams may employ exhaust treatment devices including a catalyst to remove NOx from the exhaust gas stream.

Examples of exhaust treatment devices include: catalytic converters, evaporative emissions devices, scrubbing devices, particulate filters/traps, adsorbers/absorbers, and plasma reactors. Catalytic converters may include three-way catalysts, oxidation catalysts, selective catalytic reduction (SCR) catalysts, and the like. Scrubbing devices may remove hydrocarbon (HC), sulfur, and the like. Plasma reactors may include non-thermal plasma reactors and thermal plasma reactors.

Three way catalysts (TWC catalysts) deployed in catalytic converters may facilitate the reduction of NOx using CO and residual hydrocarbons. TWC catalysts may be effective over a specific operating range of both lean and rich fuel/air conditions and in a specific operating temperature range. This purification of the exhaust gas stream by the catalytic converter depends on the exhaust gas temperature. The catalytic converter works optimally at an elevated catalyst temperature, at or above about 300 degrees Celsius. The time period between when the exhaust emissions begin (i.e., "cold start"), until the time when the catalyst heats up to a light-off temperature, may be referred to as the light-off time. Light-off temperature is the catalyst temperature at which fifty percent (50 percent) of the emissions from the engine are being converted as they pass through the catalyst.

One method of heating the catalytic converter is to heat the catalyst by contact with high temperature exhaust gases from the engine. This heating, in conjunction with the exothermic nature of the oxidation reactions occurring at the catalyst, will bring the catalyst to light-off temperature. However, until the light-off temperature is reached, the exhaust gases pass through the catalytic converter relatively unchanged. In addition, the composition of the engine exhaust gas changes as the engine temperature increases from a cold start temperature to an operating temperature, and the TWC catalyst is designed to work best with the exhaust gas composition that is present at normal elevated engine operating temperatures.

Selective Catalytic Reduction (SCR) may use ammonia that is injected into the exhaust gas stream to react with NOx over a catalyst to form nitrogen and water. Three types of catalysts have been used, including base metal systems, noble metal systems and zeolite systems. The noble metal catalysts operate in a low temperature regime (240 degrees Celsius to 270 degrees Celsius), but are inhibited by the presence of $SO_2$. The base metal catalysts, such as vanadium pentoxide and titanium dioxide, operate in the intermediate temperature range (310 degrees Celsius to 400 degrees Celsius), but at high temperatures they tend to promote oxidation of $SO_2$ to $SO_3$. The zeolites can withstand temperatures up to 600 degrees Celsius and, when impregnated with a base metal, have an even wider range of operating temperatures.

Selective Catalytic Reduction with hydrocarbons reduces NOx emissions. Organic compounds can selectively reduce NOx over a catalyst under excess $O_2$ conditions. However, the conversion efficiency was reduced outside the temperature range of 300 degrees Celsius to 400 degrees Celsius.

It may be desirable to have catalysts that can effect NOx reduction across a wide range of temperatures and operating conditions. It may be desirable to have a catalyst that can effect NOx reduction using unmodified diesel or other hydrocarbon reductants that on the average have less than 4 carbon atoms per molecule. It may be desirable if the method and apparatus could be implemented on existing engines and did not use large inventories of chemicals.

BRIEF DESCRIPTION

In one embodiment, a catalyst composition is provided that includes a catalytic metal secured to a substrate, and the substrate is mesoporous and has pores that are templated.

In one embodiment, a catalyst composition includes a catalytic metal secured to a mesoporous substrate. The mesoporous substrate is a reaction product of a reactive solution, a solvent, a modifier, and a templating agent.

In one embodiment, a method includes reacting a reactive solution and a templating agent to form a gel; and calcining the gel to form a substrate having a mesoporous template that is capable of supporting a catalyst composition.

BRIEF DESCRIPTION OF FIGURES

FIG. 1 depicts the chemical structures of various surfactants that can be used in the templating agent;

DETAILED DESCRIPTION

Figures 2A, 2B, 2C:
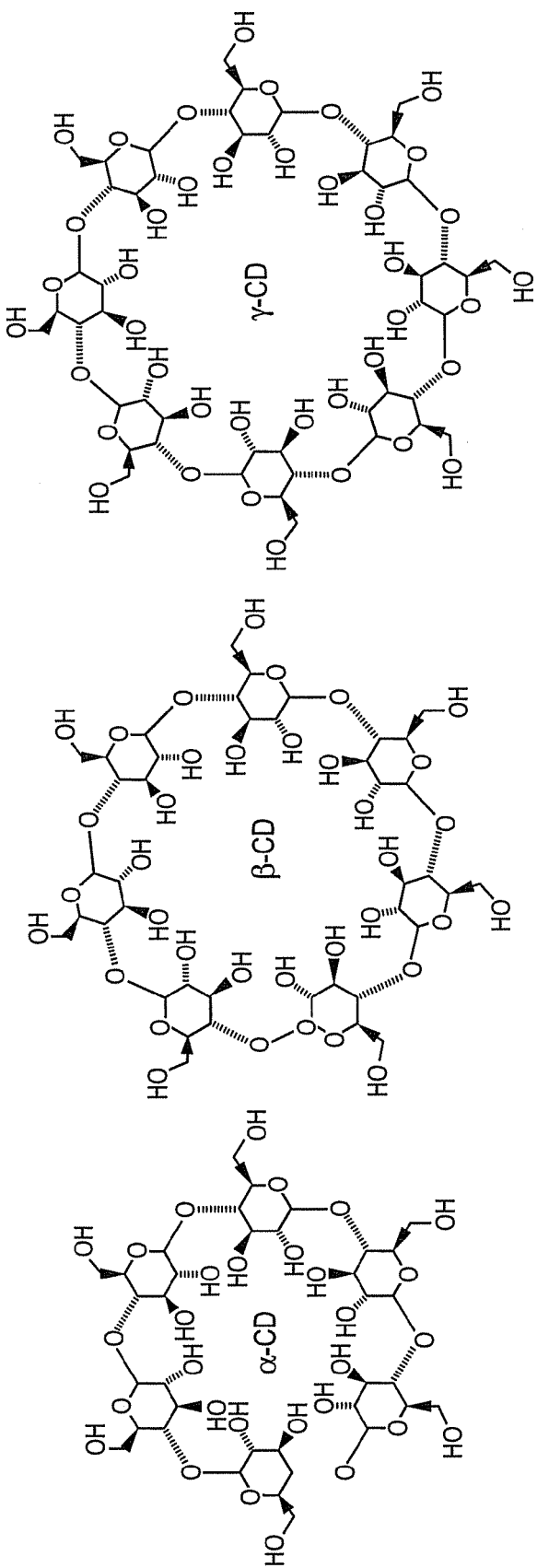
FIG. 2 depicts the chemical structures of various cyclodextrins that can be used in the templating agent.
Figure 3A:
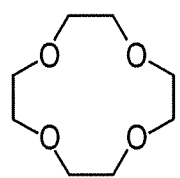
FIG. 3 depicts the chemical structures of various crown ethers that can be used in the templating agent.
Figure 3B:
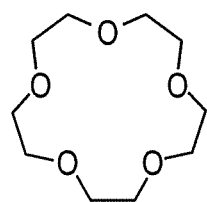
Figure 3C:
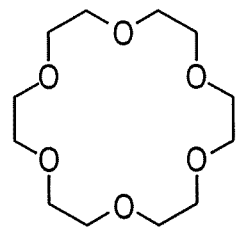
Figure 3D:
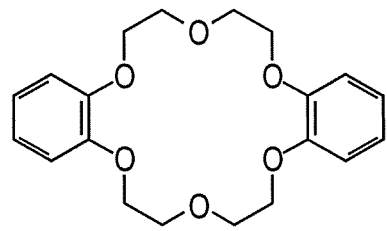
Figure 3E:
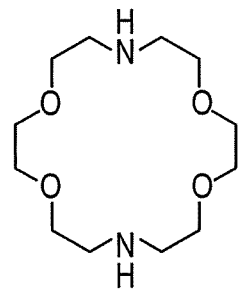

This invention includes embodiments that may relate to catalysts. This invention includes embodiments that may relate to methods of making catalysts. This invention includes embodiments that may relate to articles that include catalysts.

As used herein, without further qualifiers mesoporous refers to a material containing pores with diameters in a range of from about 2 nanometers to about 50 nanometers. A catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. Templating refers to a controlled patterning; and, templated refers to determined control of an imposed pattern and may include molecular self-assembly. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

Disclosed herein is a catalyst composition for reducing NOx that is present in an exhaust gas stream including emissions generated from combustion in furnaces, ovens, and engines. The catalyst composition includes a catalytic metal disposed on a substrate. The substrate has pores of a size effective to prohibit aromatic species from poisoning the catalyst composition. When the catalyst composition is employed to reduce NOx generated in emissions from furnaces, ovens and engines, a variety of hydrocarbons can be effectively used as a reductant. In an exemplary embodiment, diesel can be used as a reductant.

Suitable catalyst compositions disclosed herein may be manufactured from a reactive solution that includes a substrate precursor, a solvent, a modifier, and a suitable templating agent. A suitable substrate precursor may include an inorganic alkoxide. During preparation, the reactive solution is gelled and calcined to produce the substrate. A catalytic metal may be impregnated into the gel or into the substrate to produce the catalyst composition. The use of the templating agent in the reactive solution controls pore formation in the substrate.

Suitable catalytic composition may include a catalytic metal. Suitable catalytic metals may include one or more alkali metals, alkaline earth metals, transition metals, and main group metals. Examples of suitable catalytic metals are silver, platinum, gold, palladium, iron, nickel, cobalt, gallium, indium, ruthenium, rhodium, osmium, and iridium. In one embodiment, the catalytic metal may include a combination of two or more of the foregoing metals. An exemplary catalytic metal is silver.

An average catalytic composition particle size is less than about 100 nanometers. In one embodiment, the average catalytic composition particle size is in a range of from about 0.1 nanometers to about 1 nanometer, from about 1 nanometer to about 5 nanometers, from about 5 nanometers to about 15 nanometers, from about 15 nanometers to about 25 nanometers, from about 25 nanometers to about 50 nanometers, or greater than about 50 nanometers.

The catalytic metals may be present in the catalyst composition in an amount greater than about 0.025 mole percent. The amount selected may be based on end use parameters, economic considerations, desired efficacy, and the like. In one embodiment, the amount is in a range of from about 0.025 mole percent to about 0.2 mole percent, from about 0.2 mole percent to about 1 mole percent, from about 1 mole percent to about 5 mole percent, from about 5 mole percent to about 10 mole percent, from about 10 mole percent to about 25 mole percent, from about 25 mole percent to about 35 mole percent, from about 35 mole percent to about 45 mole percent, from about 45 mole percent to about 50 mole percent, or greater than about 50 mole percent. An exemplary amount of catalytic metal in the catalyst composition is about 1.5 mole percent to about 5 mole percent.

The substrate may include an inorganic material. Suitable inorganic materials may include, for example, inorganic oxides, inorganic carbides, inorganic nitrides, inorganic hydroxides, inorganic oxides, inorganic carbonitrides, inorganic oxynitrides, inorganic borides, or inorganic borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\beta$-$Fe_2O_3$, $\gamma$-$Fe_2O_3$, $\epsilon$-$Fe_2O_3$, $Fe_3O_4$, or the like), calcium oxide (CaO), and manganese dioxide ($MnO_2$ and $Mn_3O_4$). Examples of suitable inorganic carbides include silicon carbide (SiC), titanium carbide (TiC), tantalum carbide (TaC), tungsten carbide (WC), hafnium carbide (HfC), or the like. Examples of suitable nitrides include silicon nitrides ($Si_3N_4$), titanium nitride (TiN), or the like. Examples of suitable borides include lanthanum boride ($LaB_6$), chromium borides (CrB and $CrB_2$), molybdenum borides ($MoB_2$, $Mo_2B_5$ and MoB), tungsten boride ($W_2B_5$), or the like. An exemplary inorganic substrate is alumina. The alumina may be crystalline or amorphous.

As noted above, the substrate is porous. In one embodiment, the average pore size of the substrate is controlled and selected to reduce or eliminate poisoning. Poisoning may affect catalytic ability, and may be by aromatic species present in the reductant or in the exhaust gas stream.

The substrate may be mesoporous and have average diameters of pore greater than about 2 nanometers. In one embodiment, the substrate may have average pores sizes in a range of from about 2 nanometers to about 3 nanometers, from about 3 nanometers to about 5 nanometers, from about 5 nanometers to about 7 nanometers, from about 7 nanometers to about 10 nanometers, from about 10 nanometers to about 15 nanometers, from about 15 nanometers to about 17 nanometers, from about 17 nanometers to about 20 nanometers, from about 20 nanometers to about 25 nanometers, from about 25 nanometers to about 30 nanometers, from about 30 nanometers to about 35 nanometers, from about 35 nanometers to about 45 nanometers, from about 45 nanometers to about 50 nanometers, or greater than about 50 nanometers. The average pore size may be measured using nitrogen measurements (BET). An exemplary substrate is a mesoporous substrate.

The pore size may have a narrow monomodal distribution. In one embodiment, the pores have a pore size distribution polydispersity index that is less than about 1.5, less than about 1.3, or less than about 11. In one embodiment, the distribution in diameter sizes may be bimodal, or multimodal. The porous materials may be manufactured via a templating process, which will be described below.

The pores may be distributed in a controlled and repeating fashion to form a pattern. In one embodiment, the pore arrangement is regular and not random. The pores may be ordered and may have an average periodicity. The average pore spacing may be controlled and selected based on the surfactant selection that is used during the gelation. In one embodiment, the pores are unidirectional, are periodically spaced, and have an average periodicity. One porous substrate has pores that have a spacing of greater than about 20 Angstroms (Å). In one embodiment, the spacing is in a range of from about 20 Å to about 40 Å, from about 40 Å to about 50, from about 50 Å to about 100 Å, from about 100 Å to about 150 Å, from about 150 Å to about 200 Å, from about 200 Å to about 250 Å, from about 250 Å to about 300 Å, or greater than about 300 Å. The average pore spacing (periodicity) may be measured using small angle X-ray scattering.

The porous substrate may have a surface area greater than about $0.5 \text{ m}^2/\text{gram}$. In one embodiment, the surface area is in a range of from about $0.5 \text{ m}^2/\text{gram}$ to about $10 \text{ m}^2/\text{gram}$, from about $10 \text{ m}^2/\text{gram}$ to about $100 \text{ m}^2/\text{gram}$, from about $100 \text{ m}^2/\text{gram}$ to about $200 \text{ m}^2/\text{gram}$, or from about $200 \text{ m}^2/\text{gram}$ to about $1200 \text{ m}^2/\text{gram}$. In one embodiment, the porous substrate has a surface area that is in a range from about $0.5 \text{ m}^2/\text{gram}$ to about $200 \text{ m}^2/\text{gram}$. In one embodiment, the porous substrate has a surface area in a range of from about $200 \text{ m}^2/\text{gram}$ to about $250 \text{ m}^2/\text{gm}$, from about $250 \text{ m}^2/\text{gram}$ to about $500 \text{ m}^2/\text{gm}$, from about $500 \text{ m}^2/\text{gram}$ to about $750 \text{ m}^2/\text{gm}$, from about $750 \text{ m}^2/\text{gram}$ to about $1000 \text{ m}^2/\text{gm}$, from about $1000 \text{ m}^2/\text{gram}$ to about $1250 \text{ m}^2/\text{gm}$, from about $1250 \text{ m}^2/\text{gram}$ to about $1500 \text{ m}^2/\text{gm}$, from about $1500 \text{ m}^2/\text{gram}$ to about $1750 \text{ m}^2/\text{gm}$, from about $1750 \text{ m}^2/\text{gram}$ to about $2000 \text{ m}^2/\text{gm}$, or greater than about $2000 \text{ m}^2/\text{gm}$.

The porous substrate may be present in the catalyst composition in an amount that is greater than about 50 mole percent. In one embodiment, the amount present is in a range of from about 50 mole percent to about 60 mole percent, from about 60 mole percent to about 70 mole percent, from about 70 mole percent to about 80 mole percent, from about 80 mole percent to about 90 mole percent, from about 90 mole percent to about 95 mole percent, from about 95 mole percent to about 98 mole percent, from about 98 mole percent to about 99 mole percent, from about 99 mole percent to about 99.9975 mole percent, of the catalyst composition.

In one method of manufacturing, the catalyst composition and a reactive solution is mixed in a vessel with a suitable solvent, a modifier, and a suitable templating agent. The substrate precursor is selected as an inorganic alkoxide. The reactive solution includes a substrate precursor, which is initially in the form of a sol, and is converted to a gel by the sol gel process. A catalytic metal salt may be impregnated into the gel by incipient wetness impregnation. The gel is filtered, washed, dried and calcined to yield a solid catalyst composition that includes the catalytic metal disposed on a porous substrate. During the calcination process, the metal salt may be reduced to a catalytic metal.

In one embodiment, the catalytic metal salt may be a part of the reactive solution. The sol can include the reactive metal salt prior to gelation. After gelation, the gel is filtered, washed, dried and calcined to yield a catalyst composition that includes the catalytic metal disposed on a porous substrate. During the calcination process, the metal salt is reduced to a metal.

In one embodiment, the gel may be subjected to supercritical extraction in order to produce the porous substrate. Carbon dioxide can be used as the supercritical fluid to facilitate the supercritical extraction.

The calcination is conducted at temperatures in a range of from about 350 degrees Celsius to about 400 degrees Celsius, from about 400 degrees Celsius to about 500 degrees Celsius, from about 500 degrees Celsius to about 600 degrees Celsius, from about 600 degrees Celsius to about 700 degrees Celsius, or from about 700 degrees Celsius to about 800 degrees Celsius. In one embodiment, the calcination is conducted at a temperature of about 550 degrees Celsius. The calcination may be conducted for a time period of from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

In one method of manufacturing the catalyst composition, a reactive solution includes a substrate precursor and is mixed in a vessel with a suitable solvent, a modifier, and a suitable templating agent. The substrate precursor may include an inorganic alkoxide. The reactive solution may be in the form of a sol, and may convert to a gel by the sol gel process. The gel is calcined to form a solid. The solid is coated with a solution of a metal salt to form a washcoated substrate. The solution of the metal salt includes a metal salt and a solvent. Suitable metal salts and solvents are listed below. The coating process may include dip coating, spin coating, centrifuging, spray coating, painting by hand or by electrostatic spray painting, or the like.

The washcoated substrate is subjected to the calcination process listed above, to reduce the metal salt to a metal and to form the catalyst composition. The calcination process is conducted at the temperatures and for the times listed above.

Suitable inorganic alkoxides may include one or more of tetraethyl orthosilicate, tetramethyl orthosilicate, aluminum isopropoxide, aluminum tributoxide, aluminum ethoxide, aluminum-tri-sec-butoxide, aluminum tert-butoxide, antimony (III) ethoxide, antimony (III) isopropoxide, antimony (III) methoxide, antimony (III) propoxide, barium isopropoxide, calcium isopropoxide, calcium methoxide, chloro triisopropoxy titanium, magnesium di-tert-butoxide, magnesium ethoxide, magnesium methoxide, strontium isopropoxide, tantalum (V) butoxide, tantalum (V) ethoxide, tantalum (V) ethoxide, tantalum (V) methoxide, tin (IV) tert-butoxide, diisopropoxytitanium bis(acetylacetonate) solution, titanium (IV) (triethanolaminato) isopropoxide solution, titanium (IV) 2-ethylhexyloxide, titanium (IV) bis (ethyl acetoacetato)diisopropoxide, titanium (IV) butoxide, titanium (IV) butoxide, titanium (IV) diisopropoxide bis(2,2, 6,6-tetramethyl-3,5-heptanedionate), titanium (IV) ethoxide, titanium (IV) isopropoxide, titanium (IV) methoxide, titanium (IV) tert-butoxide, vanadium (V) oxytriethoxide, vanadium (V) oxytriisopropoxide, yttrium (III) butoxide, yttrium (III) isopropoxide, zirconium (IV) bis(diethyl citrato) dipropoxide, zirconium (IV) butoxide, zirconium (IV) diisopropoxidebis (2,2,6,6-tetramethyl-3,5-heptanedionate), zirconium (IV) ethoxide, zirconium (IV) isopropoxide zirconium (IV) tert-butoxide, zirconium (IV) tert-butoxide, or the like. An exemplary inorganic alkoxide is aluminum sec-butoxide.

The reactive solution contains an inorganic alkoxide in an amount greater than about 1 weight percent based on the weight of the reactive solution. In one embodiment, the reactive solution contains an inorganic alkoxide in an amount in a range of from about 1 weight percent to about 5 weight percent, from about 5 weight percent to about 10 weight percent, from about 10 weight percent to about 15 weight percent, from about 15 weight percent to about 20 weight percent, from about 20 weight percent to about 30 weight percent, from about 30 weight percent to about 40 weight percent, from about 40 weight percent to about 50 weight percent, or greater than about 50 weight percent.

Suitable solvents include aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non polar solvents may include benzene, toluene, methylene chloride, carbon tetrachloride, hexane, diethyl ether, or tetrahydrofuran. Co-solvents may also be used. Ionic liquids may be used as solvents during gelation. Exemplary solvents include 2-butanol and 2-propanol.

Solvents may be present in an amount greater than about 0.5 weight percent. In one embodiment, the amount of solvent present may be in a range of from about 0.5 weight percent to about 1 weight percent, from about 1 to about 20 weight percent, from about 20 weight percent to about 50 weight percent, from about 50 weight percent to about 100 weight percent, from about 100 weight percent to about 200 weight percent, from about 200 weight percent to about 300 weight percent, from about 300 weight percent to about 400 weight percent, from about 400 weight percent to about 500 weight percent, from about 500 weight percent to about 600 weight percent, from about 600 weight percent to about 700 weight percent, from about 700 weight percent to about 800 weight percent, or greater than about 800 weight percent, based on the total weight of the reactive solution. Selection of the type and amount of solvent may affect or control the amount of porosity generated in the catalyst composition, as well as affect or control other pore characteristics.

Modifiers may be used to control hydrolysis kinetics of the inorganic alkoxides. Suitable modifiers may include one or more ethyl acetoacetate (EA), ethylene glycol (EG), triethanolamine (TA), or the like. In one embodiment, the reactive solution contains a modifier in an amount greater than about 0.1 weight percent, based on the weight of the reactive solution. In one embodiment, the amount of modifier present may be in a range of from about 0.1 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, or greater than about 5 weight percent.

The templating agents serve as templates and may facilitate the production of substrates containing directionally aligned tubular meso-channel forms, or pores. Control of the pore characteristic may, in turn, provide control of the particle size of catalytic metal by reducing the catalytic metal lability or propensity to agglomerate. The particle size of catalytic metal may be controlled, with respect to pore formation of the porous template, by controlling or affecting one or more of pore size, pore distribution, pore spacing, or pore dispersity.

The reactive solution may include the templating agent in an amount greater than about 0.1 weight percent, based on the weight of the reactive solution. In one embodiment, the templating agent amount is present in a range of from about 0.01 weight percent to about 0.2 weight percent, from about 0.2 weight percent to about 1 weight percent, from about 1 weight percent to about 5 weight percent, from about 5 weight percent to about 10 weight percent, from about 10 weight percent to about 25 weight percent, from about 25 weight percent to about 35 weight percent, from about 35 weight percent to about 45 weight percent, from about 45 weight percent to about 50 weight percent, or greater than about 50 weight percent. An exemplary amount of templating agent based on the weight of the reactive solution is about 1.5 weight percent to about 5 weight percent.

Selection of the type(s) and amounts of the templating agent may affect or control the pore characteristics of the resultant templated substrate. Suitable templating agents may include one or more surfactants. Suitable surfactants may include cationic surfactants, anionic surfactants, non-ionic surfactants, or Zwitterionic surfactants. In one embodiment, the templating agent may include one or more cyclic species. Examples of such cyclic species may include cyclodextrin and crown ether.

Suitable cationic surfactants may include cetyltrimethyl ammonium bromide (CTAB), cetylpyridinium chloride (CPC), polyethoxylated tallow amine (POEA), benzalkonium chloride (BAC), and benzethonium chloride (BZT). Other suitable cationic surfactants may include those having a chemical structure denoted by $CH_3(CH_2)_{15}N(CH_3)_3$—Br, $CH_3(CH_2)_{15}$—$(PEO)_n$—OH where n=2 to 20 and where PEO is polyethylene oxide, $CH_3(CH_2)_{14}COOH$ and $CH_3(CH_2)_{15}NH_2$. Other suitable cationic surfactants may include one or more fluorocarbon surfactants, such as $C_3F_7O$ $(CFCF_3CF_2O)_2CFCF_3$—$CONH(CH_2)_3N(C_2H_5)_2CH_3I)$ commercially available as FC-4.

Suitable anionic surfactants may include one or more of sodium dodecyl sulfate (SDS), ammonium lauryl sulfate, alkyl sulfate salts, sodium laureth sulfate also known as sodium lauryl ether sulfate (SLES), alkyl benzene sulfonate, soaps, fatty acid salts, or sodium dioctyl sulfonate (AOT). Suitable Zwitterionic surfactants may include dodecyl betaine, dodecyl dimethylamine oxide, cocamidopropyl betaine, or coco ampho-glycinate.

Nonionic surfactants may have polyethylene oxide molecules as hydrophilic groups. Suitable ionic surfactants may include alkyl poly(ethylene oxide), copolymers of poly(ethylene oxide) and poly(propylene oxide) commercially called Poloxamers or Poloxamines and commercially available under the trade name PLURONICS. Examples of copolymers of poly (ethylene oxide) are $(EO)_{19}(PO)_{39}(EO)_{11}$, $(EO)_{20}(PO)_{69}(EO)_{20}$, $(EO)_{13}(PO)_{30}(EO)_{13}$, poly(isobutylene)-block-poly (ethylene oxide), poly (styrene)-block-poly (ethylene oxide) diblock copolymers, and block copolymer hexyl-oligo (p-phenylene ethynylene)-poly (ethylene oxide). Additional examples for copolymers of poly(ethylene oxide) are shown in the FIG. 1.

Suitable non-ionic surfactants may include one or more alkyl polyglucosides, octylphenol ethoxylate, decyl maltoside, fatty alcohols, cetyl alcohol, oleyl alcohol, cocamide monoethanolamine, cocamide diethanolamine, cocamide triethanolamine, 4-(1,1,3,3-tetramethyl butyl)phenyl-poly (ethylene glycol), polysorbitan monooleate, or amphiphilic poly (phenylene ethylene) (PPE). Suitable poly glucosides may include octyl glucoside. Other suitable non-ionic surfactants may include long-chain alkyl amines, such as primary alkylamines and N,N-dimethyl alkylamines. Suitable primary alkylamines may include dodecylamine and hexadecylamine. Suitable N,N-dimethyl alkylamines may include N,N-dimethyl dodecylamine or N,N-dimethyl hexadecylamine.

In one embodiment, the templating agent may include cyclodextrin. Cyclodextrins may include cyclic oligosaccharides that include 5 or more α-D-glucopyranoside units linked 1 to 4, as in amylose (a fragment of starch). Suitable cyclodextrins in the templating agent may include 5-membered to about 150-membered cyclic oligosaccharides. Exemplary cyclodextrins include a number of glucose monomers ranging from six to eight units in a ring. Suitable cyclodextrins are α-cyclodextrin, a six membered sugar ring molecule; β-cyclodextrin, a seven sugar ring molecule; γ-cyclodextrin, an eight sugar ring molecule; or the like. The structures for the α-cyclodextrin, β-cyclodextrin, and the γ-cyclodextrin are shown in the FIGS. 2 (*a*), (*b*) and (*c*), respectively.

As noted above, the templating agent can include crown ethers. Crown ethers are heterocyclic chemical compounds that include a ring containing several ether groups. Suitable crown ethers may include oligomers of ethylene oxide, the repeating unit being ethyleneoxy, i.e., —$CH_2CH_2O$—. Useful members of this series may include the tetramer (n=4), the pentamer (n=5), and the hexamer (n=6). Crown ethers derived from catechol may be used in the templating agent. Crown ethers that strongly bind certain types of cations to form complexes may be included in the templating agents. The oxygen atoms in the crown ether may coordinate with a cation located at the interior of the ring, whereas the exterior of the ring may be hydrophobic. For example, 18-crown-6 has high affinity for potassium cation, 15-crown-5 for sodium cation, and 12-crown-4 for lithium cation. Some suitable crown ethers are displayed in the FIGS. 3 (*a*)-(*c*). An exemplary crown ether is 18-crown-6 depicted in (c) of FIG. 3 as octylphenol ethoxylate, which is commercially available as TRITON X 114.

Suitable metal salts may include the salts of transition metals. In one embodiment, metal salts may include one or more metals selected from silver, platinum, gold, palladium, iron, nickel, cobalt, or the like. Suitable salts may include halides, sulfates, nitrates, sulfides, or the like. An exemplary salt is silver nitrate.

The metal salt may be present in the reactive solution in an amount greater than about 0.1 weight percent, based on the total weight of the reactive solution. In one embodiment, the metal salt is present in an amount that is in a range of from about 0.01 weight percent to about 0.2 weight percent, from about 0.2 weight percent to about 1 weight percent, from about 1 weight percent to about 5 weight percent, from about 5 weight percent to about 10 weight percent, from about 10 weight percent to about 25 weight percent, from about 25 weight percent to about 35 weight percent, from about 35 weight percent to about 45 weight percent, from about 45 weight percent to about 50 weight percent, or greater than about 50 weight percent. An exemplary amount of metal salt in the reactive solution is about 1.5 weight percent to about 5 weight percent.

The catalyst composition may be manufactured in powdered form. The catalyst composition may be manufactured in the form of a monolith. In one embodiment, the catalyst composition may be disposed on a prefabricated monolithic core. The prefabricated monolith core with the catalyst composition disposed thereon may be subjected to freeze drying as well as to calcining to produce a monolithic catalyst composition. In one embodiment, the prefabricated monolith core with the catalyst composition disposed thereon may be subjected to supercritical fluid extraction and to calcining to produce a monolithic catalyst composition.

After formation, the catalyst composition may be disposed in an exhaust gas stream of an automobile or a locomotive having NOx therein. The catalyst composition contacts and reduces NOx to nitrogen. The catalyst composition may be disposed into the exhaust gas stream either in powdered form or in the form of a monolith.

EXAMPLES

The following examples illustrate methods and embodiments in accordance with the invention, and as such should not be construed as imposing limitations upon the claims. These examples demonstrate the manufacture of the catalyst compositions described herein and demonstrate their performance compared with other catalyst compositions that are commercially available. Unless specified otherwise, all components are commercially available from common chemical suppliers such as Alpha Aesar, Inc. (Ward Hill, Mass.), Spectrum Chemical Mfg. Corp. (Gardena, Calif.), and the like.

Example 1

Manufacture of a Catalyst Composition

The catalyst composition is designated as Sample Ag-(TX-114). An amount of TRITON X-114 surfactant serves as the templating agent. The catalyst composition is manufactured by making a first solution, a second solution and a third solution, which are mixed together.

The first solution includes ethyl acetoacetate (26.5 g, 0.2 mol), TRITON X-114 (139 g) and 2-butanol (500 mL). These are combined in a 5-L, 3-neck flask equipped with an addition funnel, a condenser, and a mechanical stirrer. The second solution includes aluminum sec-butoxide ($Al(O^{sec}Bu)_3$) (500 g, 2 mol) and 2-butanol (2 L)). The second solution is added to the first solution with stirring and held at an ambient temperature for 30 minutes. The third solution includes water (75 mL, 4 mol) and 2-butanol (950 mL) and is added to the first and second solutions via the addition funnel over a period of about 90 minutes. The solutions are heated at ambient temperature for about 3 hours. Then, the contents are heated to about reflux for 20 hours to 24 hours.

The contents cool and are filtered using a #50 paper filter and washed with ethanol. The obtained white solid is dried in under vacuum. A vacuum oven is used at 80 degrees Celsius under standard vacuum. The solid is subjected to Soxhlet extraction with ethanol for 20 hours to 24 hours. The solid is dried in a vacuum oven at 80 degrees Celsius to yield 164 grams of reaction product. The dry reaction product is heated under a flow of nitrogen in a tube furnace from room temperature to 550 degrees Celsius at a heating rate of 2 degrees Celsius/minute. Once achieved, the temperature is maintained at 550 degrees Celsius for 1 hour. Afterward, the reaction product is calcined in a flow of air at 550 degrees Celsius for 5 hours to produce a substrate. The substrate is wash-coated with a metal salt and calcined once again to obtain a catalyst composition. This wash coating of the substrate is as described below.

Example 2

Preparation of a Catalyst Composition

The catalyst composition is designated as Sample Ag-(T15-S-9). TERGITOL 15-S-9 is used as the templating agent. Ethyl acetoacetate (EA modifier, 6.5 g, 0.05 mol) and TERGITOL 15-S-9 (surfactant, molecular weight (MW)=approximately 579 g/mole, 6 g, 0.01 mol) are weighed out in a small beaker and dissolved in 30 ml 2-butanol. Aluminum sec-butoxide ($Al(O^{sec}Bu)_3$) (25.5 g, 0.1 mol) (EA modifier/Al mole ratio=0.5) are weighed out in a wide-mouth jar and dissolved in 100 ml 2-butanol.

The ethyl acetoacetate and TERGITOL 15-S-9 solution are added together under stirring to the $Al(O^{sec}Bu)_3$ solution to form an Aluminum-containing mixture. A solution that includes 42.5 ml 2-butanol and 3.75 ml water ($H_2O$) ($H_2O$:Al mole ratio of 2) is added drop-wise from a dropping funnel to the Aluminum-containing mixture under continuous stirring from an overhead stirrer. After the water-2-butanol mixture addition, the reaction mixture is clear. The mixture is capped and allowed to stir at room temperature overnight, but shows little or no sign of hydrolysis.

The reaction mixture is aged for 24 hours at 80 degrees Celsius. After heating at 80 degrees Celsius for several hours the entire mass gels. The resulting gel is broken up and is filtered overnight. The solid is subjected to Soxhlet extraction with ethanol for 24 hours. The solid is dried in a vacuum oven at 50 degrees Celsius overnight. The dry material is heated under a flow of nitrogen in a tube furnace from room temperature to 550 degrees Celsius at a heating rate of 2 degrees Celsius/minute. Once achieved, the temperature is maintained at 550 degrees Celsius for 1 hour. Afterward, the material is calcined in a flow of air at 550 degrees Celsius for 5 hours to form the substrate. The substrate is washcoated with a metal salt and calcined again to obtain the catalyst composition. The wash coating of the substrate is described below.

Example 3

Preparation of a Catalyst Composition

The catalyst composition is designated as Sample Ag-(T15-S-15). The same procedure is used as described above in EXAMPLE 2 to make the dry catalyst, with the exception that TERGITOL 15-S-15 is the surfactant (MW=approximately 843 g/mole, 8.5 g, 0.01 mol) used as the templating agent rather than TERGITOL 15-S-9. The TERGITOL 15-S-15 is dissolved in 50 ml 2-butanol. The additional solvent compensates for the increased viscosity of the TERGITOL 15-S-15 over that of TERGITOL 15-S-9. The Al($O^{sec}Bu$)$_3$ is dissolved in 80 ml 2-butanol. The substrate is washcoated with a metal salt and calcined again to obtain the catalyst composition. The wash coating of the substrate is described below.

Example 4

Preparation of a Catalyst Composition

The catalyst composition is designated as Sample Ag-(P64L). Ethyl acetoacetate (EA modifier) (6.5 g, 0.05 mol) and PLURONIC 64L (templating agent, MW=approximately 2884 g/mole, 28.5 g, 0.01 mol), are weighed out in a beaker and dissolved in 30 ml 2-butanol. Al($O^{sec}Bu$)$_3$ (25.5 g, 0.1 mol) (EA modifier/Al mole ratio=0.5) are weighed out in a wide-mouth jar and dissolved in 100 ml 2-butanol. The solution of ethyl acetoacetate and PLURONIC 64L is added all at once under stirring to the Al($O^{sec}Bu$)$_3$ solution to from the Aluminum-containing mixture. A solution composed of 42.5 ml 2-butanol and 3.75 ml $H_2O$($H_2O$:Al mole ratio of 2), is added drop-wise from a dropping funnel to the Aluminum-containing mixture under continuous stirring from an overhead stirrer.

The reaction mixture becomes very viscous. At the end of the addition step the reaction mixture solidifies into a transparent gel. The gel is manually stirred with a spatula, is capped and is aged for 24 hours at 80 degrees Celsius. The resulting yellow gel is broken up, and is filtered overnight to form a solid. The solid is subjected to Soxhlet extraction with ethanol for 24 hours. The solid dries in a vacuum oven at 50 degrees Celsius overnight to form a dry material. The dry material is heated under a flow of nitrogent in a tube furnace from room temperature to 550 degrees Celsius at a heating rate of 2 degrees Celsius/minute. Once achieved, the temperature is maintained at 550 degrees Celsius for 1 hour. Afterward the material is calcined in a flow of air at 550 degrees Celsius for 5 hours to produce the substrate. The substrate is washcoated with a metal salt and calcined once again to obtain the catalyst composition. The wash coating of the substrate is described below.

Example 5

Use of Beta-Cyclodextrin as Templating Agent

The sample is designated as Ag-(CD). Ethylacetoacetate (2.65 g, 20 mmol) and beta-cyclodextrin-hydrate (18 g, 15.8 mmol) are combined with 2-butanol (50 mL) in a 3-necked round bottom flask equipped with a mechanical stirrer, reflux condenser and addition funnel. Aluminum sec-butoxide (50 g, 0.2 mol) is added in 2-butanol (200 mL). The 2-butanol along with water (7.5 mL, 0.42 mol) is slowly added with stirring at ambient temperature. Following the addition, the contents are heated to reflux for 24 hours. After cooling, the solution is filtered and the recovered solid is washed with ethanol and subjected to Soxhlet extraction with ethanol. The solid dries in a vacuum oven at 50 degrees Celsius overnight. The dry material is heated under a flow of nitrogen in a tube furnace from room temperature to 550 degrees Celsius at a heating rate of 2 degrees Celsius/minute. Once achieved, the temperature is maintained at 550 degrees Celsius for 1 hour. The resultant material is calcined in a flow of air at 550 degrees Celsius for 5 hours to form the substrate.

Example 6

Use of Crown Ethers as the Templating Agent

This sample is designated as Ag-(CE). The material is prepared in the same manner as in EXAMPLE 5, except that the crown ether, 18-crown-6 (4.2 g), is used in place of beta-cyclodextrin as the templating agent. FIG. 3 shows the activity of the materials from EXAMPLES 5 and 6 compared to a silver standard control.

Example 7

Treatment of Substrates to Produce the Catalyst Composition

The catalyst compositions of the previous Examples are subjected to wash coating to prepare the catalyst composition. The catalyst compositions are prepared by incipient wetness impregnation of the sized support (425-710 nm) with a silver nitrate (AgNO$_3$) solution. The volume of the AgNO$_3$ solution used is twice the pore volume of the support and contains the correct number of moles of silver (Ag) to arrive at a target mole percent.

The incipient wetness (IW) impregnation is done on calcined mesoporous alumina (MPA) to remove residual templating agent (if any remains). The pore volume of the calcined mesoporous alumina is measured by BET, and this value is used to calculate a concentration of the AgNO$_3$ solution needed for incipient wetness impregnation. For a determined Al$_2$O$_3$ sample and a certain Ag loading, one can calculate the number of moles of silver needed to achieve a determined loading, thus an amount of AgNO$_3$. The volume for incipient wetness impregnation is twice the pore volume (as determined by BET in cubic centimeters per gram). The concentration of the AgNO₃ solution is determined as moles of Ag/volume of solution. As differing mesoporous alumina materials have correspondingly different pore volumes, the concentration of the AgNO₃ solutions needed for IW impregnation differs depending on the material. The AgNO₃ solution is aqueous. The second calcination step decomposes the AgNO₃ and produces a catalyst final form.

A catalyst containing 2 mole percent Ag on Norton alumina is called AgSTD and is present as a control. The impregnated materials are dried in a vacuum oven at 80 degrees Celsius and calcined in air at 600 degrees Celsius for 6 hours in a box furnace. The prepared catalysts for each sample, above, are weighed out (~50 mg) and placed in 2 ml GC vials until use in a reactor. The exact weight of each catalyst is measured using a BOHDAN weighing robot.

Test Conditions

The test conditions for the aforementioned catalyst compositions are as follows. The catalysts are pretreated with 7 percent $H_2O$ and 50 ppm $SO_2$, and 12 percent $O_2$ for 7 hours at 450 degrees Celsius to "age" or "sulfur soak" the catalysts. The samples from the Examples listed above are disposed in a high throughput screen (FTS) reactor to determine their nitrogen oxide conversion capabilities in a simulated exhaust gas stream. The reactor has 32 tubes, each tube of which can receive a catalyst composition. No catalyst is placed in the tube #1. Tube #1 is used to measure the nitrogen oxide ($NO_x$) concentration in the exhaust gas stream. The catalyst composition Samples are placed in the other tubes and the reduction in NOx concentration is measured. The reduction in NOx concentration relates to catalytic activity of the catalyst compositions.

The simulated exhaust gas stream contains an exhaust gas composition and a reductant. Three samples of each catalyst are tested in each run and each catalyst is tested at three temperatures. The temperatures are 275 degrees Celsius, 375 degrees Celsius and 425 degrees Celsius.

The exhaust gas composition is 12 percent $O_2$, 600 ppm NO, 7 percent $H_2O$, 1 ppm $SO_2$ and the balance $N_2$. The reductant used is a liquid mixture composed of 2,2,4, trimethyl pentane (64 weight percent), octane (7 weight percent) and toluene (29 weight percent), also known as Moctane. The NOx conversion results for the catalyst compositions with the Moctane reductant are shown in the FIG. 4. Another liquid reductant used is a distillation cut (<210 degrees Celsius) of ultra low sulfur diesel (ULSD) fuel. The NOx conversion results for the catalyst composition and the distillation cut of the ULSD fuel are shown in FIG. 5. For all the Samples, using the HTS reactor, the $C_1$:NO ratio used in the exhaust gas composition is 8 ($C_1$:NO is defined as the number of carbon atoms in the reductant stream per number of nitrogen oxide (NO) molecules).

Data is presented as percent NOx conversion by measuring the NOx concentration through tube #1 with no catalyst present and measuring the NOx concentration over the other tubes with catalysts and determining the percent change. The bar graphs show average NOx conversion of 3 samples (lower portion of each bar) and the standard deviation (the upper portion of each bar).

Figure 4:
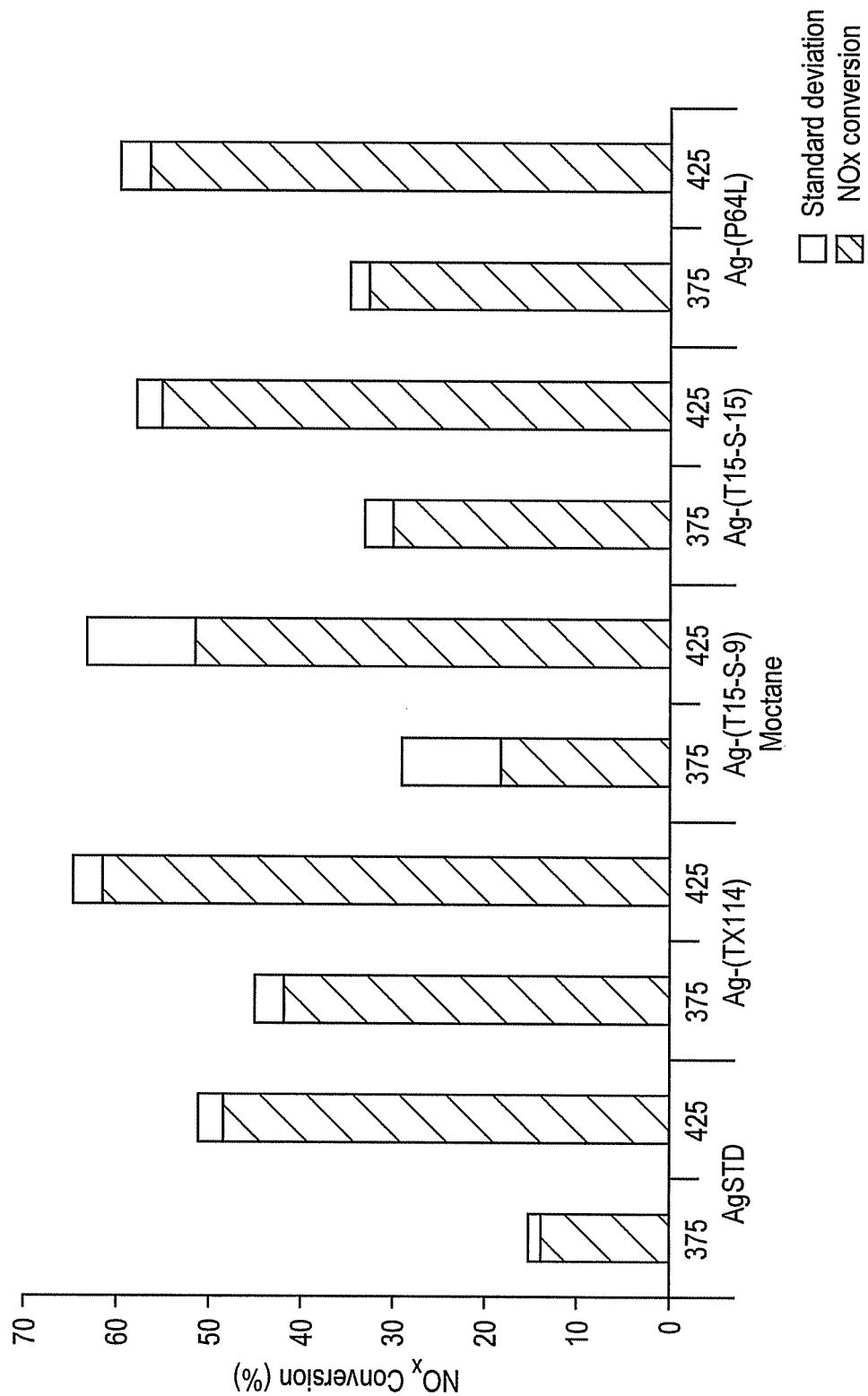
FIG. 4 is a bar graph depicting NOx conversion at two different temperatures with Moctane reductant and using the catalyst compositions detailed in Example 1-Example 4. The comparative sample is AgSTD.
Figure 5:
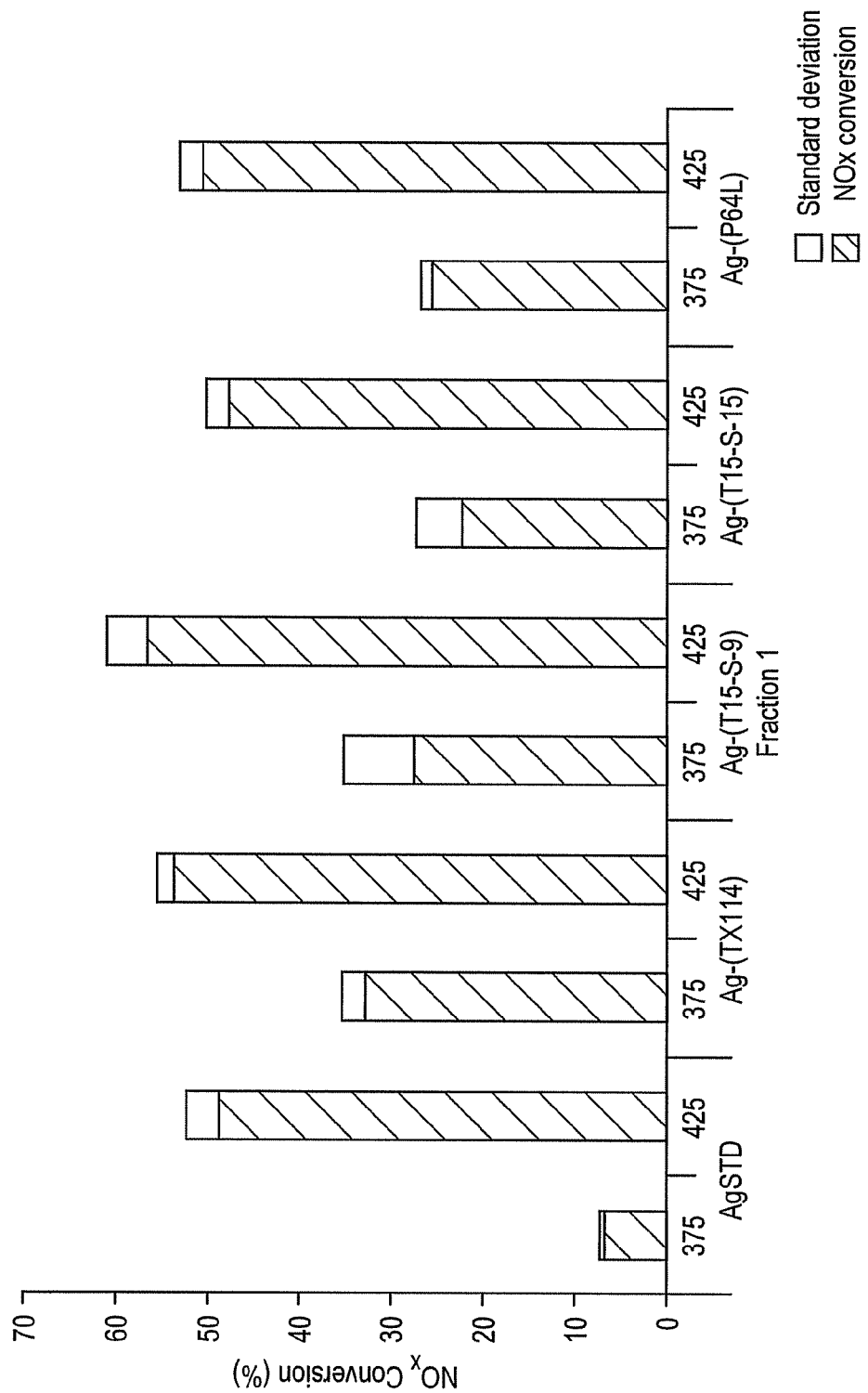
FIG. 5 is a bar graph depicting NOx conversion at two different temperatures with the distillation cut of the ULSD fuel as a reductant and using the catalyst compositions detailed in Example 1-Example 4. The comparative sample is AgSTD.

The results for the Samples produced in Examples 1-4 are shown in the FIGS. 4 and 5. As noted above, in the FIG. 4, the reductant is Moctane, while in the FIG. 5 the reductant is the distillation cut of the ULSD fuel. FIG. 4 is a bar graph depicting NOx conversion at two different temperatures with Moctane reductant and using the catalyst compositions of the Samples produced in Examples 1-4 and compared with the AgSTD.

FIG. 5 is a bar graph depicting NOx conversion at two different temperatures with the distillation cut of the ULSD fuel as a reductant and using the catalyst compositions detailed in Samples from Examples 1-4 and compared with the AgSTD. From the FIGS. 4 and 5, NOx conversion rate is affected by the catalyst composition manufactured with the templating agents. The templating agents that include surfactants produce relatively superior results at all temperatures over the AgSTD composition that does not contain a templated substrate.

Figure 6:
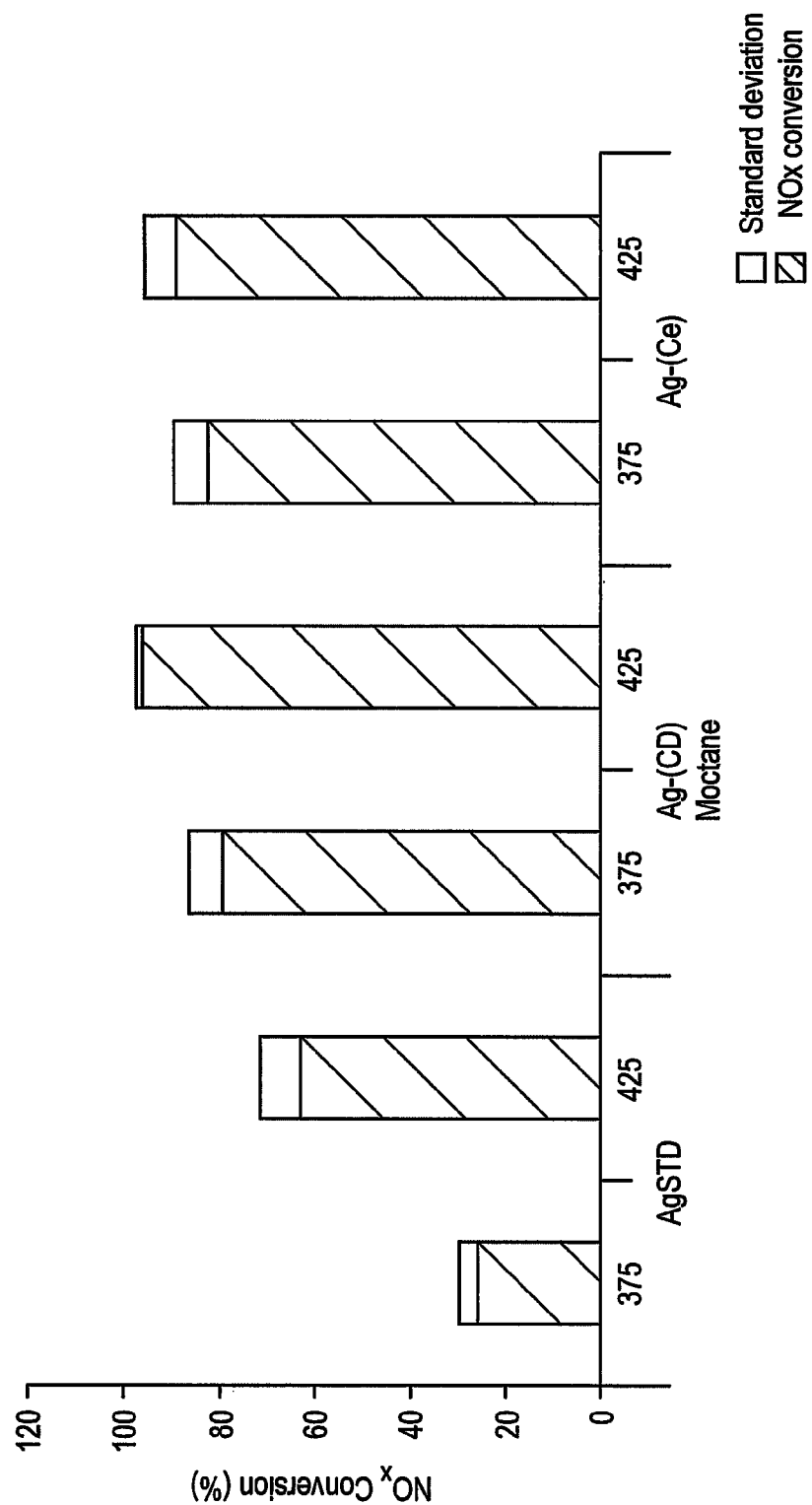
FIG. 6 is a bar graph depicting NOx conversion at two different temperatures using the crown ethers and the cyclodextrins as templating agents. The comparative sample is AgSTD.

The results for the Samples from Examples 5-6 are shown in the FIG. 6. The reductant for these Examples is Moctane. FIG. 6 shows that NOx conversion rate is affected by the catalyst composition manufactured with the templating agents that include the cyclodextrins and the crown ethers. These samples produce relatively superior results at all temperatures over the AgSTD composition that does not contain a templated substrate.

Small angle X-ray scattering is used to characterize the catalyst composition manufactured in a manner similar to that described above. The small angle X-ray scattering data is depicted in the FIG. 7. From this data it can be seen that the porous substrates have average interdomain (interpore) spacings of 75 Angstroms and 95 Angstroms respectively.

Example 8

Performance of Catalyst Compositions

This example compares conversion performance of NOx contained in an exhaust gas streams for samples that include embodiments of the invention relative to comparative catalyst compositions. The comparative catalyst compositions do not contain substrates manufactured using a templating agent. This example demonstrates that the catalyst composition can be manufactured and used in the form of a monolith. A SICAS monolithic core is commercially available as, for example, DUROTRAP from Corning Incorporated Environmental Technologies (Corning, N.Y.). A reactive solution as disclosed in the Example 1 is disposed on the SICAS monolithic core to form a substrate. An amount of 3-mole percent silver is disposed on the SICAS monolithic core that contained the dry gel. The silver catalyst is formed on the dry gel by dip coating the SICAS monolithic core with the substrate into a catalytic solution of silver nitrate and 2-butanol.

To manufacture the comparative composition, SBA 200 alumina is disposed on a SICAS monolithic core. An amount of 2 weight percent silver is disposed on the SICAS monolithic core that contained the SBA 200 alumina.

Figure 8:
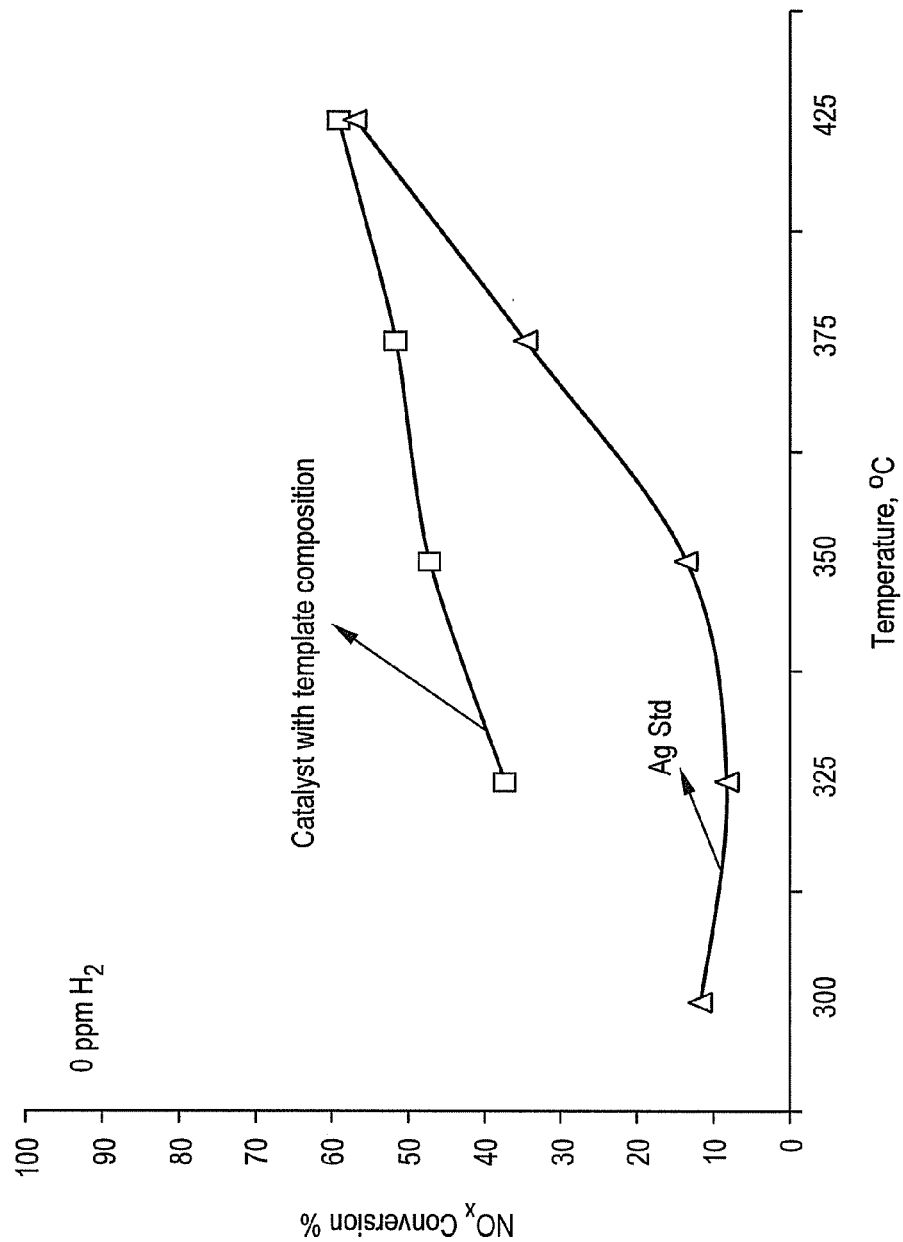
FIG. 8 is a graph showing the $NO_x$ conversion at temperatures of 300 to 425 degrees Celsius.
Figure 9:
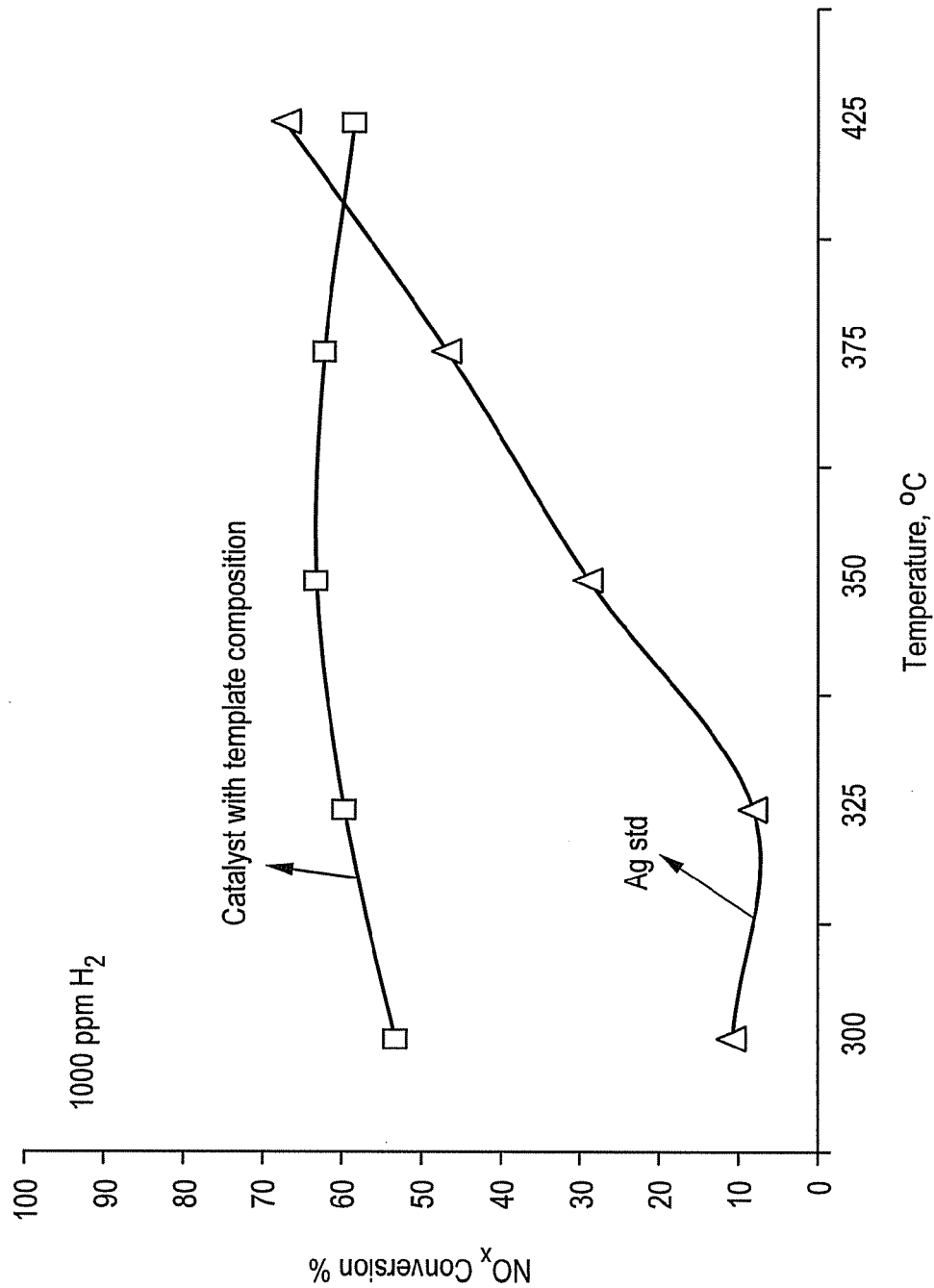
FIG. 9 is a graph showing the $NO_x$ conversion at temperatures of 300 to 425 degrees Celsius.

Both catalysts are tested using the simulated exhaust gas stream as described above. The simulated exhaust gas stream contains an exhaust gas composition and a reductant. The reductant contains the distillation cut of the ULSD fuel. The results are shown in the FIGS. 8 and 9. FIGS. 8 and 9 are graphs showing the NOx conversion at temperatures of 300 degrees Celsius to 425 degrees Celsius.

Figure 7:
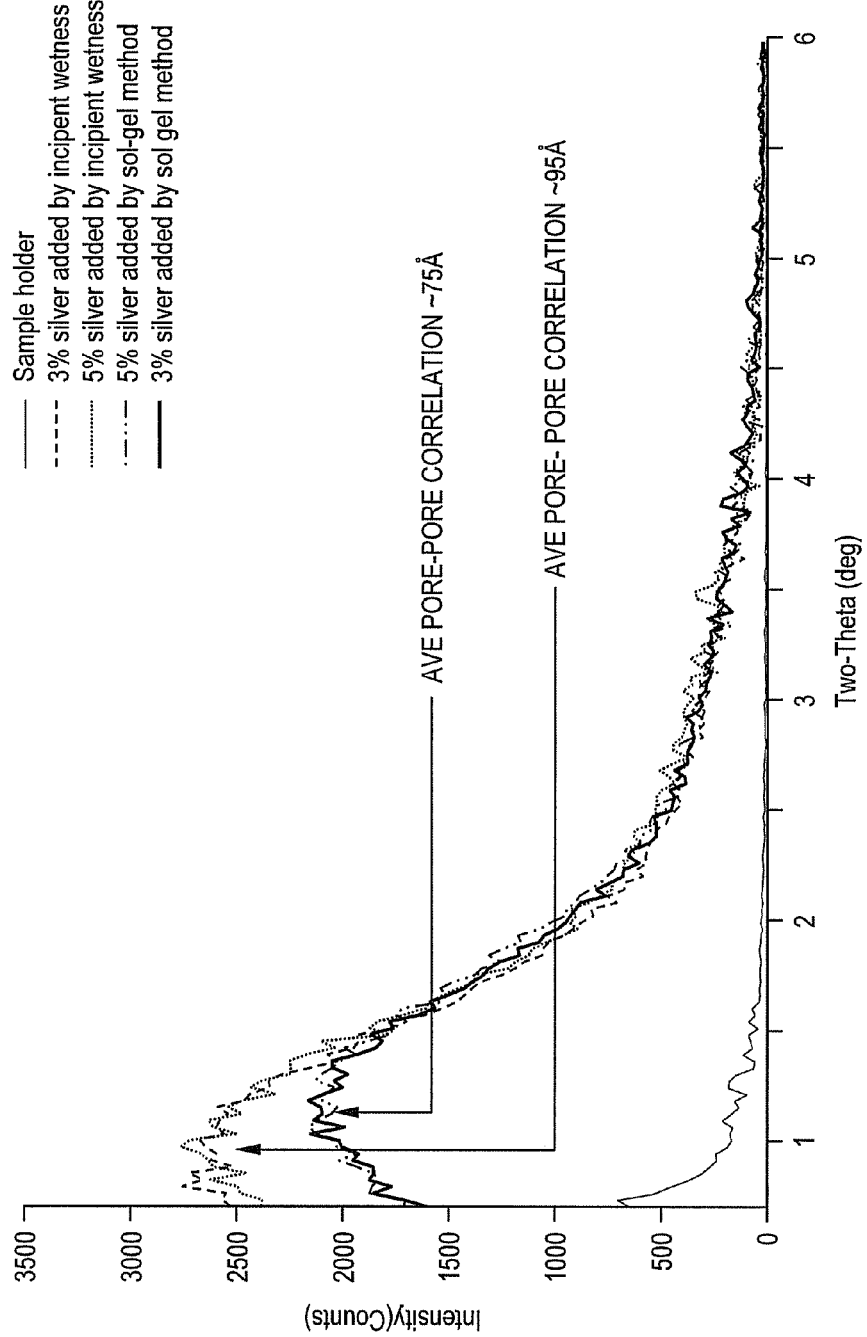
FIG. 7 is a graph depicting small angle X-ray scattering data for the samples manufactured by methods described herein.

For the test results depicted in the FIG. 8, no hydrogen is used as a reductant in the exhaust gas stream, while for the test results depicted in the FIG. 9, hydrogen is used in an amount of 1000 parts per million (ppm) as a reductant in the exhaust gas stream. With reference to FIGS. 8 and 9, the sample manufactured according to an embodiment of the invention shows relatively better NOx conversion results over a relatively wider temperature range relative to the comparative composition (designated as—Ag Std). In FIG. 8, the NOx conversion for the inventive Samples is in a range of from about 38 percent to about 60 percent. In FIG. 7, the NOx conversion is in a range of from about 50 percent to about 65 percent. The Ag-Std composition shows relatively low conversion capabilities at temperatures of 300 degrees Celsius to 375 degrees Celsius compared with the catalyst composition manufactured using the templating agent.

The catalyst composition may reduce more than about 30 percent of the NOx present in an exhaust gas stream under determined use conditions. In one embodiment, the amount of reduction is at least about 10 percent, at least about 20 percent, or at least about 30 percent relatively more NOx reduced than other comparative catalyst compositions. In addition, the catalytic performance may be available over a temperature range of from about 200 degrees Celsius to about 500 degrees Celsius. The catalyst composition may reduce NOx while using reductants that contain aromatic species or hydrocarbon species that on the average have less than four carbon atoms per molecule such as diesel.

With regard to the term reaction product, reference is made to substances, components, or ingredients in existence at the time just before first contacted, formed in situ, blended, or mixed with one or more other substances, components, or ingredients in accordance with the present disclosure. A substance, component or ingredient identified as a reaction product may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another. The use of the terms "a" and "an" and "the" and similar referents in the context of describing the invention (especially in the context of the following claims) are to be construed to cover both the singular and the plural, unless otherwise indicated herein or contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of producing a catalyst composition comprising:
    mixing a reactive solution comprising a substrate precursor with a templating agent to form a gel; and calcining the gel to form a porous substrate,
    wherein a catalytic material or precursor thereof is present in at least one of the reactive solution or the gel and wherein the templating agent affects one or more of pore size, pore distribution, pore spacing, or pore dispersity of the porous substrate formed by the calcining of the gel.

2. The method as defined in claim 1, wherein the reactive solution comprises a catalytic metal salt.

3. The method as defined in claim 1, further comprising disposing a catalytic metal salt into the gel.

4. The method as defined in claim 1, further comprising disposing a catalytic metal salt on the substrate.

5. The method as defined in claim 1, further comprising contacting the catalyst composition to an exhaust gas stream having NOx therein such that the catalyst composition reduces or eliminates the NOx in the presence of diesel fuel during determined operating conditions.

6. The method as defined in claim 1, further disposing a catalytic metal salt into the reactive solution or into the gel, wherein during said calcining the catalytic metal salt is reduced to a catalytic metal; and
    controlling a particle size of the catalytic metal by reducing a lability or propensity to agglomerate of the catalytic metal.

7. The method as defined in claim 1, further comprising;
    disposing a catalytic metal salt into the reactive solution or into the gel, wherein during said calcining the catalytic metal salt is reduced to a catalytic metal; and
    controlling a particle size of the catalytic metal by controlling, with respect to pore formation of the porous template, one or more of pore size, pore distribution, pore spacing, or pore dispersity.

8. The method as defined in claim 1, wherein said mixing comprises mixing a reactive solution with a templating agent comprising a cationic surfactant including cetyltrimethyl ammonium bromide (CTAB); cetylpyridinium chloride (CPC); polyethoxylated tallow amine (POEA); benzalkonium chloride (BAC); benzethonium chloride (BZT); cationic surfactants having a chemical structure denoted by $CH_3(CH_2)_{15}N(CH_3)_3$—Br, $CH_3(CH_2)_{15}$—$(PEO)_n$—OH, where n=2 to 20 and where PEO is polyethylene oxide; or, a fluorocarbon surfactant.

9. The method as defined in claim 1, wherein said mixing comprises mixing a reactive solution with a templating agent comprising a nonionic surfactant including one or more alkyl polyglucosides, octylphenol ethoxylate, decyl maltoside, fatty alcohols, cetyl alcohol, oleyl alcohol, cocamide monoethanolamine, cocamide diethanolamine, cocamide triethanolamine, tetramethyl butyl)phenyl-poly (ethylene glycol), polysorbitan monooleate, or amphiphilic poly (phenylene ethylene) (PPE).

10. The method as defined in claim 1, wherein said mixing a templating agent comprises mixing a templating agent that comprises a cationic surfactant, a non-ionic surfactant, or a Zwitterionic surfactant.

11. The method as defined in claim 10, wherein said mixing comprises mixing a reactive solution with a templating agent comprising a Zwitterionic surfactant including dodecyl betaine, dodecyl dimethylamine oxide, cocamidopropyl betaine, or coco ampho-glycinate.

12. The method as defined in claim 1, wherein the substrate precursor comprises an inorganic alkoxide.

* * * * *

UNITED STATES PATENT AND TRADEMARK OFFICE
CERTIFICATE OF CORRECTION

| | | |
|---|---|---|
| PATENT NO. | : 8,530,369 B2 | Page 1 of 1 |
| APPLICATION NO. | : 12/123070 | |
| DATED | : September 10, 2013 | |
| INVENTOR(S) | : Lewis et al. | |

It is certified that error appears in the above-identified patent and that said Letters Patent is hereby corrected as shown below:

On the Title Page, in Item (56), under "OTHER PUBLICATIONS", in Column 2, Line 1, delete "Cataysis" and insert -- Catalysis --, therefor.

On Title Page 2, in Item (56), under "OTHER PUBLICATIONS", in Column 2, Line 60, delete "Startegies" and insert -- Strategies --, therefor.

In the Specification

In Column 4, Line 67, delete "about 11." and insert -- about 1.1. --, therefor.

In Column 5, Line 15, delete "50," and insert -- 50Å, --, therefor.

In Column 8, Line 43, delete "(EO)$_{11}$," and insert -- (EO)$_{19}$, --, therefor.

In Column 13, Line 23, delete "(FTS)" and insert -- (HTS) --, therefor.

In the Claims

In Column 16, Line 41, in Claim 7, delete "comprising;" and insert -- comprising: --, therefor.

In Column 16, Lines 55-56, in Claim 8, delete "CH$_3$(CH$_2$)I$_{15}$N(CH$_3$)$_3$-Br," and insert -- CH$_3$(CH$_2$)$_{15}$N(CH$_3$)$_3$-Br, --, therefor.

In Column 16, Line 65, in Claim 9, delete "tetramethyl butyl)" and insert -- 4-(1,1,3,3-tetramethyl butyl) --, therefor.

Signed and Sealed this
Fifth Day of November, 2013

Teresa Stanek Rea
*Deputy Director of the United States Patent and Trademark Office*